United States Patent [19]

Fillipo et al.

[11] Patent Number: 4,975,202

[45] Date of Patent: Dec. 4, 1990

[54] SURFACTANT STABILIZER AND METHOD FOR BOILER WATER

[75] Inventors: Bruce K. Fillipo, Dublin; Robert E. Horn, Southampton, both of Pa.

[73] Assignee: Betz Laboratories, Inc., Trevose, Pa.

[21] Appl. No.: 316,896

[22] Filed: Feb. 28, 1989

[51] Int. Cl.$^5$ ................................................. C02F 5/12
[52] U.S. Cl. ..................................... 210/698; 252/180
[58] Field of Search ............... 210/696, 698, 699, 700, 210/697, 750; 252/180, 181

[56] References Cited

U.S. PATENT DOCUMENTS

| | | | |
|---|---|---|---|
| 2,580,923 | 1/1952 | Jacoby | 210/749 |
| 3,502,587 | 3/1970 | Stanford et al. | 210/699 |
| 3,630,937 | 12/1971 | Baum et al. | 252/181 |
| 4,288,327 | 9/1981 | Godlewski et al. | 210/698 |
| 4,350,606 | 9/1982 | Cuisia et al. | 252/171 |
| 4,435,303 | 3/1984 | Abadi | 252/80 |
| 4,589,985 | 5/1986 | Yorke | 210/699 |
| 4,671,888 | 6/1987 | Yorke | 252/180 |
| 4,828,713 | 5/1989 | McDonald et al. | 210/697 |

FOREIGN PATENT DOCUMENTS 7512198 10/1974 Netherlands ........................ 210/698

*Primary Examiner*—Peter Hruskoci
*Assistant Examiner*—Krisanne Shideler
*Attorney, Agent, or Firm*—Alexander D. Ricci; Steven D. Boyd

[57] ABSTRACT

A surfactant stabilizer and method for aqueous boiler treatments is disclosed. The method includes using the combination of one or more lower alkyl or substituted amines or phosphoric acid with nonionic surfactant boiler water treatments. The addition of one or more lower alkyl or substituted amines or phosphoric acid stabilizes the nonionic surfactant boiler water treatments by increasing high temperature stability and/or high salt concentration tolerance.

5 Claims, No Drawings

SURFACTANT STABILIZER AND METHOD FOR BOILER WATER

FIELD OF THE INVENTION

The present invention pertains to a product and process for the treatment of boiler water systems with surfactant based deposit control agents. More particularly, the present invention pertains to stabilization of surfactant based deposit control agents using materials efficacious in boiler systems.

BACKGROUND OF THE INVENTION

As described comprehensively in U.S. Pat. No. 4,288,327, the deposition of solids onto heat transfer surfaces of steam generating equipment is a major problem. Common contaminants in boiler feedwater that can form deposits are calcium and magnesium salts (hardness), carbonate salts, sulfite, phosphate, siliceous matter, and iron oxides. Any foreign matter introduced into the boiler in soluble or particulate form will tend to form deposits on the heat transfer surfaces. Formation of deposits on the heat transfer surfaces will decrease the efficacy of the heat transfer and can lead to overheating, circulation restrictions, damage to the system, loss of effectiveness, and increased cost due to cleaning, unscheduled outages, and replacement of equipment. In extreme case, catastrophic tube failure can occur.

Deposit control agents are frequently added to the feedwater of boilers. Their ultimate objective is to inhibit the formation of deposits on the heat transfer surfaces and to facilitate the removal of any deposits in the blowdown. Typically, this is accomplished via two mechanisms: a solubilization mechanism, where chelants or chelant type molecules form soluble complexes with the deposit forming species which are removed in the blowdown; and, an adsorption mechanism, where the deposit control agent adsorbs on the surface of the particulate matter and either inhibits the formation of the deposit, modifies crystal formation, or disperses the deposit that is being formed, and makes it more easily removable.

Phosphates, chelants and polymeric dispersants are frequently used in various combinations in boiler treatment programs. The phosphate is used to modify inorganic salt form and precipitate hardness or iron species; the chelants have the ability to complex and prevent the deposition of many cations under boiler water conditions. In higher pressure boilers, phosphate is also used for pH control and since it maintains the system at a pH where corrosion is minimized, it also acts as a corrosion inhibitor.

Polymers are used to disperse particulate matter, either the precipitates formed with the phosphate treatment, or solid or colloidal matter already present. To some extent polymers can also act as chelants to solubilize cations.

Polymers that have been used in boiler water treatment include naturally occurring and modified natural polymers such as, lignosulfonates and carboxymethyl cellulose. Synthetic anionic polymers are the more preferred materials recently, and include carboxylated polymers, sulfonated polymers and polyphosphoric acids. Copolymers incorporating combinations of the above functionalities are also used. Examples of effective synthetic polymers include polyacrylic or polymethylacrylic acids and copolymers of the two monomers; sulfonated styrene, polymaleic acid or anhydride, copolymers of sulfonated styrene and maleic anhydride, and others.

In the use of polymeric dispersants, the polymers are fed to maintain a bulk concentration which is many times higher than the effective amount of polymer needed for adsorption on the surface of the particulate matter or the heat transfer surfaces, and for chelation of hardness, etc. That is, the concentration of polymer on the surface is not only determined by the affinity of the polymer for the surface, but also by the equilibrium between the adsorbed species and the bulk species. Thus, where a treatment program might utilize 50–100 ppm of the polymeric dispersant, only 1–10 ppm of active species might be necessary if the polymer could more effectively be brought into contact with the surfaces in question. The excess dispersant can itself contribute to the impurities in the boiler and in the steam produced. Dispersants can degrade under boiler conditions, leading to organic materials such as organic acids which can be present in the steam. Thus, steam purity can be adversely affected by such polymeric dispersants. Furthermore, the organic acids can lead to corrosion in the boiler and in the areas contacted by the steam.

In many boiler designs, heat fluxes are not uniform throughout the entire unit due to design miscalculations. It is known that deposit weight densities (a measure of the amount of boiler deposition increase as heat fluxes increase, approximately as the square of the heat flux. This nonuniformity in heat transfer can lead to "hot spots" in a boiler where the heat flux can be as much as 5 times the average heat flux. These hot spots are predisposed to failure. It is often the case that in an effectively treated boiler there will still be many tube failures in the areas of high heat flux.

In commonly assigned application Ser. No. 168,288 an improved boiler water treatment combination of nonionic surfactants and certain polymeric dispersants together with chelants and/or phosphates is disclosed. The combination allows the polymer to be more effectively adsorbed onto the surfaces of particulate matter or heat transfer surfaces in a boiler.

The use of nonionic surfactants in combination with other boiler treatment actives previously cited in a single package is somewhat limited by the water solubility of such surfactants. Such surfactants generally exhibit decreased solubility at higher storage temperatures often encountered and in aqueous solutions having a high salt concentration. The onset of product instability and surfactant separation manifests itself in a cloud point. The cloud point is the temperature above which aqueous solutions become turbid and eventually form two phases. The water solubility of nonionic surfactants is dependent on the hydrophilic characteristics of the ether linkages in the polyoxyethylene chain. These ether linkages are readily hydrated at room temperature. An increase in temperature reduces the forces of hydration and the surfactants become less water soluble. Most dissolved salts, organic and inorganic, have a greater affinity for water than do the ether linkages in the nonionics and dehydrate surfactant.

SUMMARY OF THE INVENTION

The present inventors have discovered that the solubility of nonionic surfactant combinations in aqueous products can be effectively stabilized at higher storage temperatures and high salt concentrations when the surfactant is used in combination with lower alkyl amines, substituted amines or phosphoric acid. In addition these materials can be utilized to improve final product efficacy through condensate neutralization and as an alternate phosphate source. It is believed that the amines or phosphoric acid limit the dehydration of the ether linkages in the nonionic surfactants thereby limiting the effects of reduced forces of hydration in the surfactant which occurs as temperature is increased and in the presence of many salts. The formulation of a concentrated homogeneous package product offers reduced manufacturing, container, shipping and handling equipment costs.

It is therefore an object of the present invention to provide a combination of nonionic surfactant and lower alkyl or substituted amine or phosphoric acid, which provides a boiler water treatment in a single homogeneous package which is stable at higher temperatures and/or high salt concentrations often present in boiler products.

It is a further object of this invention to provide a combination of lower alkyl amines which increase the stability of a nonionic surfactant containing boiler treatment.

It is another object of this invention to provide a combination of lower alkyl or substituted amines or phosphoric acid and a nonionic surfactant containing boiler water treatment which is stable at higher storage temperatures.

It is another object of this invention to provide a combination of lower alkyl or substituted amines or phosphoric acid and a nonionic surfactant containing boiler water treatment which is stable at higher salt concentrations.

Generally, the above objectives are achieved through the use of a method utilizing the combination identified. The method is directed to improvements in the solubility or stability of nonionic surfactant containing boiler water formulations which control the formation and deposition of materials on the structural parts of steam generating systems containing an aqueous system.

DESCRIPTION OF THE PRIOR ART

Baum, et al, U.S. Pat. No. 3,630,937, discloses the use of sulfonated polystyrene combined with a chelating agent, and optionally an antifoaming agent for boiler water treatment. Antifoaming agents can be surfactants. The use of phosphates and silicates is also taught, though not in conjunction with an antifoaming agent. The Baum et al patent does not disclose the effects of high temperature or salt concentrations on the solubility of nonionic surfactants or the stabilizing action of amines or phosphoric acid.

Yorke, U.S. Pat. Nos. 4,589,985 and 4,671,888, teach the use of anionic polyelectrolytes and anionic surfactants to control alkaline earth metal scale in aqueous systems. The Yorke patents require the use of anionic surfactants. No suggestion of a solubility problem for nonionic surfactants at high temperature or high salt condition aqueous solutions is made. Further, the stabilizing affect of lower alkyl amines or phosphoric acid is not taught. The Yorke reference only refers to cooling water applications ('985, columns 3 and 4, line 68 2-3 and '888, column 4, line 3-6).

DETAILED DESCRIPTION OF INVENTION

The present invention is directed to a composition or combination of products for use in boiler water treatment. The composition includes certain nonionic surfactants in combination with certain lower alkyl or substituted amines or phosphoric acid. It was discovered that certain lower alkyl or substituted amines or phosphoric acid enhanced the stability or solubility of nonionic surfactants at higher temperatures or high salt concentrations in aqueous products often experienced in single drum boiler treatments.

The onset of product instability and surfactant separation manifests itself in a cloud point. The cloud point is the temperature above which aqueous solutions become turbid and eventually form two phases. The water solubility of nonionic surfactants is dependent on the hydrophilic characteristics of the ether linkages in the polyoxyethylene chain. These ether linkages are readily hydrated at room temperature. An increase in temperature reduces the forces of hydration and the surfactants become less water soluble. Most dissolved salts, organic and inorganic, have a greater affinity for water than do the ether linkages in the nonionics and dehydrate the surfactant.

Surfactants

The broad class, nonionic surfactants is well known. A listing of nonionic surfactants can be found in "McCutcheon's Emulsifiers and Detergents", 1987, North American Edition, McCutcheon Division, MC Publishing Co., Glen Rock, N.J. The Hwa Patent (U.S. Pat. No. 3,578,589) also contains an extensive list of nonionic surfactants herein incorporated by reference. The preferred surfactants have the following structure:

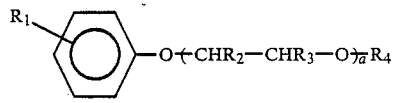

wherein $R_1$ is a straight or branched alkyl group having from about 4 to about 20 carbon atoms, $R_2$ and $R_3$ are independently hydrogen or methyl; $R_4$ is hydrogen, alkyl, aryl, or aralkyl, the alkyl portion of said aralkyl group being a straight or branched chain portion having from about 1 to about 20 carbon atoms, and the aryl portion of said aralkyl group being substituted benzene or naphthalene; and a is from 0 to about 50. Our most preferred nonionic surfactants are the alkoxylated alkyl phenols and alkoxylated alkyl phenol ethers. Most preferred for our invention are commercial materials such as the homologous series of alkoxylated octyl or nonyl phenols, sold by Rohm and Haas under the Triton label. Typical of the preferred surfactants are the Triton X- and N- series, which are alkoxylated t-octyl and nonyl phenols, respectively, containing from about 4 moles of ethylene oxide up to about 50 moles of ethylene oxide. Also preferred are the surfactants represented by the Rohm and Haas CF- series, which are ethoxylated and ethoxylated/propoxylated t-octyl phenolic ethers containing from about 5 to about 20 moles of ethylene and propylene oxide. Most preferred are nonyl phenol reacted with 9-10 moles of ethylene oxide, represented by Rohm and Haas Triton N-101, and t-octyl phenol reacted with 10 moles of ethylene oxide and capped with a benzyl ether group represented by Rohm and Haas Triton CF-10. Other nonionic surfactants, in which other alkyl groups are attached to the phenol are also effective.

Amines

The amines of the present combination which have been found to effectively stabilize the nonionic surfactants are lower alkyl amines. The lower alkyl amines may optionally contain other functional groups such as hydroxyl groups. Preferred amines include cyclohexylamine, methoxypropylamine, diethylaminoethanol (DEAE) and dimethylaminoethanol. The most preferred lower alkyl amine is diethylaminoethanol. In addition to the use of amines to stabilize nonionic surfactants in single package aqueous boiler blends, strong acids have also been found to be effective stabilizers. For example, glassy phosphates have been used in aqueous boiler systems as a phosphate source to control scale such as calcium carbonate. It has been found that the use of phosphoric acid as an alternate phosphate source stabilizes and elevates the cloud point of a nonionic surfactant in boiler products. It is believed that other strong acids which are not detrimental to aqueous boiler systems such as organic phosphonic acid and citric acid would also be effective.

The weight ratio of the nonionic surfactant to the lower alkyl or substituted amine in the aqueous product is preferably from about 1:1 to about 1:30. When the product stabilizer is an acid, the weight ratio of nonionic surfactant to acid in the aqueous product is preferably from about 1:1 to about 1:10.

The invention will now be further described with reference to a number of specific examples which are to be regarded solely as illustrative and not as restricting the scope of the invention.

EXAMPLES

In tables 1 through 5, all entries are in weight percent. As shown in Table 1, runs A and C, the use of a lower alkyl amine stabilized the nonionic surfactant Triton N-101 as indicated by the increase in product cloud point. Without the incorporation of the stabilizing agent, an approximate 50% product dilution was required to produce an equivalent cloud point through salt dilution, Runs B and C.

TABLE 1

|  | A | B | C |
| --- | --- | --- | --- |
| Water | 69.6 | 86.95 | 73.6 |
| Polyacrylate | 4.5 | 2.00 | 4.5 |
| Sodium Molybdate | 0.6 | 0.25 | 0.6 |
| Caustic Soda (L) | 1.0 | 1.10 | 1.0 |
| Triton N-101 | 1.6 | 0.70 | 1.6 |
| Polymethacrylate | 18.7 | 9.00 | 18.7 |
| DEAE | 4.0 | — | — |
| Cloud Point: | 100° F. | 100° F. | <40° F. |

In Table 2, the use of a lower alkyl amine stabilized the nonionic surfactant Triton CF-10 as indicated by the increase in product cloud point from less than 40° F. to over 80° F.

TABLE 2

|  | A | B | C | D |
| --- | --- | --- | --- | --- |
| Water | 93 | 88 | 88 | 88 |
| Triton CF-10 | 2 | 2 | 2 | 2 |
| Hampene 100 | 5 | 5 | 5 | 5 |
| DEAE | — | 5 | — | — |
| Methoxypropylamine | — | — | 5 | — |
| Morpholine | — | — | — | 5 |
| Cloud Point (°F.) | <40 | 87 | 84 | 77 |

The use of caustic to neutralize acidic materials is beneficial in freeing stabilizing amines, increasing efficiency and reducing required concentrations. It should be noted that overfeeding of caustic will also increase the total salt content and result in destabilization as shown in Table 3.

TABLE 3

|  | A | B | C |
| --- | --- | --- | --- |
| Water |  |  |  |
| Polyacrylate | 6.0 | 6.0 | 6.0 |
| Sodium Molybdate | 0.7 | 0.7 | 0.7 |
| Caustic Soda (L) | 0.0 | 3.0 | 4.0 |
| Triton N-101 | 2.1 | 2.1 | 2.1 |
| Polymethacrylate | 20.2 | 20.1 | 20.1 |
| DEAE | 5.0 | 5.0 | 5.0 |
| Cloud Point: | 66° F. | 96° F. | <40° F. |

Amine synergism was found to occur through combination of amines such as the combination of cyclohexylamine and diethylaminoethanol which was found to elevate the cloud point of a nonionic surfactant beyond the point which would be expected when the amines were employed individually. See Table 4.

TABLE 4

|  | A | B | C |
| --- | --- | --- | --- |
| Water |  |  |  |
| Polyacrylate | 60.3 | 60.3 | 60.3 |
| Sodium Molybdate | 0.7 | 0.7 | 0.7 |
| Caustic Soda (L) | 2.7 | 2.7 | 2.7 |
| Triton N-101 | 2.0 | 2.0 | 2.0 |
| Polymethacrylate | 23.3 | 23.3 | 23.3 |
| DEAE | 5.0 | — | 2.5 |
| Cyclohexylamine | — | 5.0 | 2.5 |
| Cloud Point: | 65° F. | <40° F. | 86° F. |

The use of a strong acid such as phosphoric acid was found to stabilize an ionic surfactant in an aqueous solution as evidenced by the increase in cloud point from less than 40° F. to greater than 100° F. as shown in Table 5.

TABLE 5

|  | A | B |
| --- | --- | --- |
| Water | 68.7 | 68.7 |
| Polyacrylate | 6.0 | 6.0 |
| Sodium Molybdate | 0.7 | 0.7 |
| Triton N-101 | 2.1 | 2.1 |
| Polymethacrylate | 20.1 | 20.1 |
| Phosphoric Acid (75%) | 3.0 | — |
| Cloud Point: | 105° F. | <40° F. |

While this invention has been described with respect to particular embodiments thereof, it is apparent that numerous other forms and modifications of the invention will be obvious to those skilled in the art. The appended claims and this invention generally should be construed to over all such obvious forms and modifications which are within the true spirit and scope of the present invention.

What is claimed is:

1. A method of increasing the temperature and/or salt concentration induced cloud point of an aqueous essentially nonionic surfactant solution which comprises introducing into said aqueous solution a sufficient amount for the purpose of a synergistic combination of cyclohexylamine and diethylaminoethanol.

2. The method of claim 1 wherein said nonionic surfactant has the following structure:

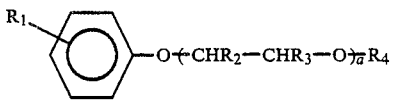

wherein $R_1$ is a straight or branched chain alkyl group having from about 4 to about 20 carbon atoms; $R_2$ and $R_3$ are independently hydrogen or methyl; $R_4$ is hydrogen, alkyl, aryl, or aralkyl, the alkyl portion being straight or branched chain having from about 1 to about 20 carbon atoms, and the aryl portion being substituted benzene or naphthalene; and a is from about 0 to about 50.

3. The method of claim 2 wherein $R_1$ is octyl and $R_4$ is hydrogen.

4. The method of claim 2 wherein $R_1$ is nonyl and $R_4$ is hydrogen.

5. The method of claim 1 wherein the weight ratio of nonionic surfactant to amines introduced into said aqueous product is about 1:1 to about 1:30.